May 28, 1935.  J. W. LEIGHTON  2,002,781
HINGED JOINT
Filed Sept. 15, 1934   2 Sheets-Sheet 1

Inventor:
John Wycliffe Leighton

May 28, 1935.   J. W. LEIGHTON   2,002,781
HINGED JOINT
Filed Sept. 15, 1934   2 Sheets-Sheet 2
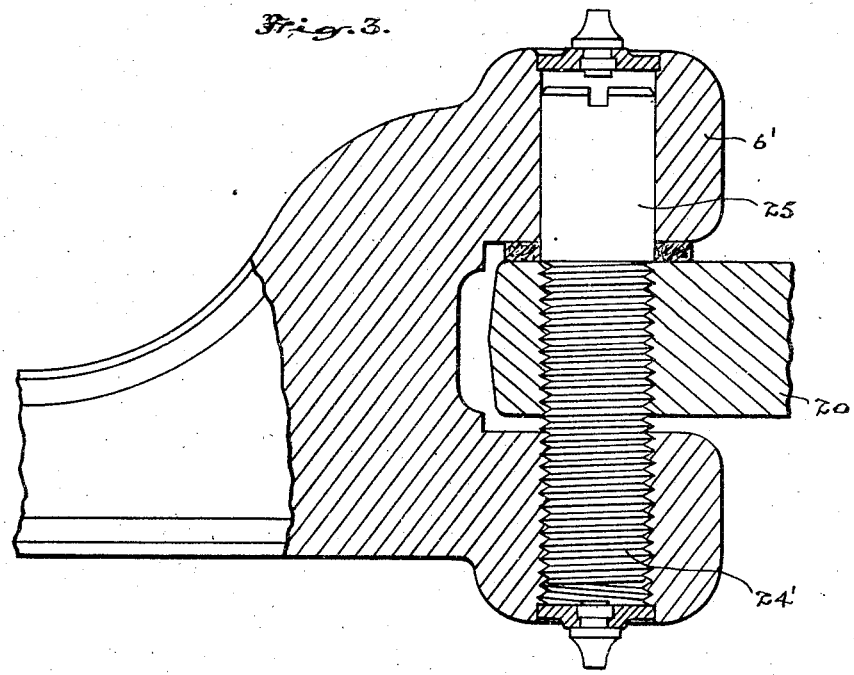
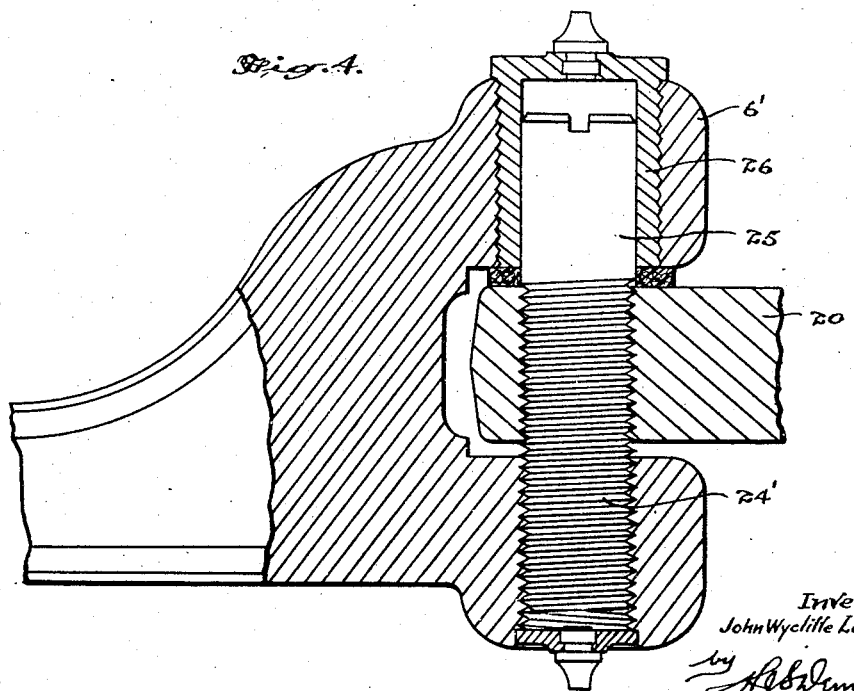
Inventor.
John Wycliffe Leighton.

Patented May 28, 1935

2,002,781

UNITED STATES PATENT OFFICE 2,002,781

HINGED JOINT

John Wycliffe Leighton, Port Huron, Mich.

Application September 15, 1934, Serial No. 744,147

4 Claims. (Cl. 287—100)

The principal objects of this invention are, to provide a joint particularly adaptable for motor car wheel suspensions, which will effect a material saving in cost and will be extremely simple to manufacture and install, and which will be capable of easy adjustment, or removal and replacement.

The principal feature of the invention consists in the novel arrangement of a threaded hinge pin in a yoke member, whereby one end of the threaded pin is journalled in a threaded bearing in the yoke member and the other end is rotatably journalled in the opposite end of the yoke member, and whereby means is provided for effecting the adjustment of the hinge pin in its bearings.

In the accompanying drawings, Figure 1 is a front elevational view of a portion of a front wheel suspension illustrating the application of my invention.

Figure 3 is a plan sectional view similar to Figure 2, showing a slightly modified structure.

Figure 4 is a plan sectional view showing a further modified structure.

Figure 1:
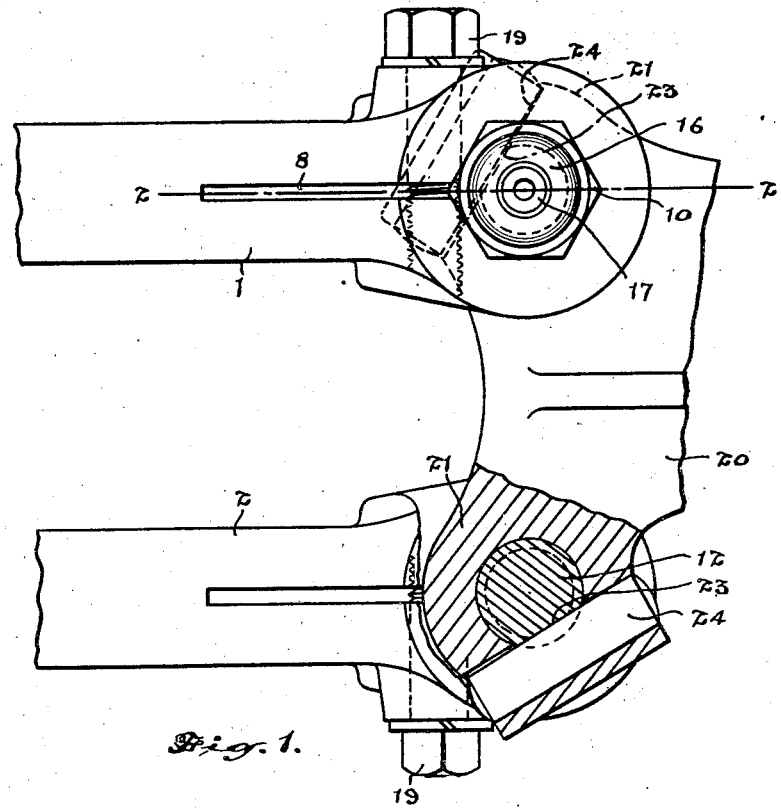
Figure 2:
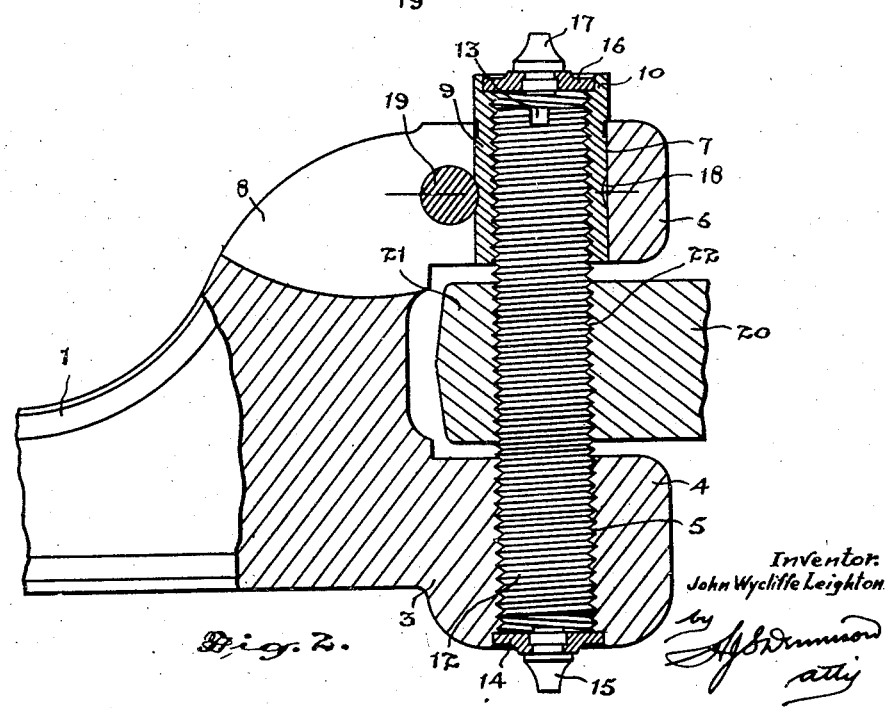
Figure 2 is a plan sectional view taken on the line 2—2 of Figure 1.

In the construction illustrated in Figures 1 and 2 a pair of parallel bars 1 and 2 are arranged one above the other and each is formed with a yoke end 3.

A lug 4 of each of the yoke ends is formed with a threaded orifice 5 extending horizontally therethrough, the surface of the threads of which form a journal bearing.

The other lug 6 of each of said yokes is formed with a cylindrical orifice 7 arranged in axial alignment with the orifice 5 and a slot 8 in said lug cuts in said orifice.

A cylindrical bushing 9 is rotatably mounted in the orifice 7 and is provided with a nut end 10 at its outer end by means of which it may be turned in said orifice. This bushing is provided with an orifice 11 threaded to correspond with the threading of the orifice 5 in the lug 4, and is in axial alignment therewith.

A hinge pin 12 formed of suitable material preferably hardened steel is threaded externally from end to end to fit the threaded bearing orifices 5 and 11 in a lug end 4 and bushing 9 respectively. This hinge pin is threaded through the bushing and into the threaded orifice 5 and is provided with a notch 13 at one end to permit of adjustment.

A disc 14 closes the open end of the orifice 5 and is provided with a suitable lubricating fitting 15 through which the lubricant may be introduced to lubricate the threaded bearing surfaces of the pin and yoke.

The bushing 9 is provided with a closure disc 16 and a lubricating fitting 17 to enable lubricant to be inserted to lubricate the threaded bearing surfaces between the hinge pin and the bushing.

The bushing is provided with an external circumferential groove 18 intermediate of its length which is engaged by a locking bolt 19 which extends across the slot 8, the locking bolt holding the bushing from removal but permitting its rotation. The tightening of the bolt, however, holds the bushing from turning after it has been adjusted.

A wheel supporting arm 20 is provided with a pair of lugs 21 which extend between the lug members 4 and 6 of the yoke ends of the bars 1 and 2 and the said lugs 20 are formed with threaded orifices 22 through which the threaded hinge pins extend.

The hinge pins are provided with slabbed surfaces 23 and when inserted into position through the lug of the member 20 they are locked thereto by the tapered pins 24 engaging the slabbed surfaces.

It will be readily understood that the relative positions of the member 20 on the hinge pins may be adjusted in the insertion of the pins therethrough and the bearing surfaces of the threads of the hinge pins in the bushing ends are adjusted to be brought into proper spiral continuity by being rotated in the lugs 6.

It will also be understood that the pins may be tightened to take up any slack or wear by the adjustment of the thread surfaces through the rotation of the bushing 9.

The construction of the joint herein described is extremely simple but is highly desirable.

In the form illustrated in Figures 3 and 4, the hinge pins 24' are provided with cylindrical ends 25, which engage smooth bearing surfaces either in the lug 6' as shown in Figure 3 or in a bushing 26, as shown in Figure 4.

In both cases it will be seen that there will not be required any adjustment for spiral continuity of bearing as the hinge pins are threaded through the arms 20 and into the single threaded bearing in the yoke end, the cylindrical end fitting in a snug bearing fit.

When the latter construction is used, as in Figure 3, the ends of both orifices are closed by suitable closure discs provided with lubricating fittings.

What I claim as my invention is:—

1. A hinge joint comprising spaced lugs having axially aligned orifices, the wall of one orifice having a threaded bearing surface, and a hinge pin threaded externally and having a threaded bearing engagement with the threaded wall of said orifice and having its other end supported in a journal bearing in the other of said lugs.

2. A hinge joint comprising spaced lugs having axially aligned orifices, one of which is formed with threaded bearing surfaces in its inner wall and the other is provided with a cylindrical surface, a threaded hinge pin having threaded bearing contact with the threaded lug surfaces and a bushing adjustably mounted in the cylindrical orifice of the other of said lugs and having a threaded surface on its inner wall engaging the threaded exterior surface of said hinge pin.

3. A hinge joint comprising spaced lugs having axially aligned orifices, one of which is formed with threaded bearing surfaces in its inner wall and the other is provided with a cylindrical surface, the latter lug having a slot cutting into one side of said cylindrical orifice, a locking bolt extending across said slot, a bushing mounted in said slotted orifice and having an internally threaded bearing surface, a threaded hinge pin extending through said bushing and engaging the bearing surface of the threaded lug, and a hinge member mounted on said hinge pin.

4. A hinge joint comprising a yoke member having a pair of spaced lugs, one of which is provided with a threaded orifice and the other with a plain journal orifice, both arranged in axial alignment, a bushing mounted in said plain orifice and having a threaded inner bearing surface, a hinge pin threaded and journalled in the threaded bearing surfaces of said bushing and orifice, means for closing the open end of the threaded orifices, means arranged in said closures for lubricating the said threaded orifices, and a hinge member mounted on said pin between the lugs of said yoke.

JOHN WYCLIFFE LEIGHTON.